United States Patent
Shen et al.

(10) Patent No.: US 12,015,571 B2
(45) Date of Patent: Jun. 18, 2024

(54) REFERENCE SIGNAL TRANSMITTING AND RECEIVING METHOD, BASE STATION, TERMINAL, AND READABLE MEDIUM

(71) Applicant: SPREADTRUM COMMUNICATIONS (SHANGHAI) CO., LTD., Shanghai (CN)

(72) Inventors: Xingya Shen, Shanghai (CN); Hualei Wang, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 804 days.

(21) Appl. No.: 16/321,639

(22) PCT Filed: Jan. 21, 2019

(86) PCT No.: PCT/CN2019/072472
§ 371 (c)(1),
(2) Date: Oct. 6, 2021

(87) PCT Pub. No.: WO2019/157905
PCT Pub. Date: Aug. 22, 2019

(65) Prior Publication Data
US 2022/0145837 A1 May 12, 2022

(30) Foreign Application Priority Data
Feb. 13, 2018 (CN) .......................... 201810153150.4

(51) Int. Cl.
*H04L 5/00* (2006.01)
(52) U.S. Cl.
CPC .......... *H04L 5/0048* (2013.01); *H04L 5/0053* (2013.01)

(58) Field of Classification Search
CPC ...... H04B 7/06; H04B 7/0626; H04B 7/0695; H04L 5/0007; H04L 5/001; H04L 5/0023;
(Continued)

(56) References Cited

U.S. PATENT DOCUMENTS 10,541,772 B2 * 1/2020 Damnjanovic ....... H04W 16/14
10,778,486 B2 * 9/2020 Bhorkar ................. H04L 5/001
(Continued)

FOREIGN PATENT DOCUMENTS

CN 102480342 5/2012
CN 103379072 10/2013
(Continued)

OTHER PUBLICATIONS

English Translation of Zhou et al. (CN 106936558A), pp. 1-24, Apr. 7, 2017.*
(Continued)

*Primary Examiner* — Frank Duong
(74) *Attorney, Agent, or Firm* — Occhiuti & Rohlicek LLP (57) ABSTRACT

There is provided a method for transmitting a reference signal. The method for transmitting the reference signal includes: determining locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information; and transmitting the DRS at the locations in time and frequency domains of the DRS.

18 Claims, 3 Drawing Sheets

(58) Field of Classification Search
CPC ..... H04L 5/0048; H04L 5/005; H04L 5/0051; H04L 5/0053; H04L 5/0057; H04L 5/0078; H04L 5/0082; H04L 5/0091; H04L 5/0094; H04L 27/26; H04L 27/2602; H04L 27/261; H04L 27/2613; H04L 27/2675; H04W 16/14; H04W 56/001; H04W 56/0015; H04W 72/04; H04W 72/044; H04W 72/0446; H04W 72/0453; H04W 72/12; H04W 72/54
See application file for complete search history.

(56) References Cited

U.S. PATENT DOCUMENTS

| | | | |
|---|---|---|---|
| 11,070,333 | B2 * | 7/2021 | Si ..................... H04W 56/001 |
| 2016/0073366 | A1 | 3/2016 | Ng et al. |
| 2017/0070312 | A1 * | 3/2017 | Yi ..................... H04W 72/541 |
| 2017/0078062 | A1 | 3/2017 | Park et al. |
| 2018/0027481 | A1 * | 1/2018 | Xu ..................... H04L 5/0048 370/252 |

FOREIGN PATENT DOCUMENTS

| | | | |
|---|---|---|---|
| CN | 104955018 | A | 9/2015 |
| CN | 104968052 | | 10/2015 |
| CN | 106411805 | | 2/2017 |
| CN | 106688268 | A | 5/2017 |
| CN | 106936558 | A * | 7/2017 |
| CN | 107682133 | A | 2/2018 |
| CN | 106688268 | B | 4/2020 |
| EP | 3192197 | A1 | 7/2017 |
| JP | 2017533679 | A | 11/2017 |
| JP | 6441483 | B2 | 12/2018 |
| KR | 20170056527 | A | 5/2017 |
| WO | 2015156573 | | 10/2015 |
| WO | 2016039559 | A1 | 3/2016 |

OTHER PUBLICATIONS

Chinese Office Action dated Jun. 16, 2020 in CN Application No. 201810153150.4.
Chinese Office Action issued in CN Application No. 201810153150.4.
PCT International Search Report, PCT/CN2019/072472, dated Apr. 18, 2019, 4 pgs.

* cited by examiner

REFERENCE SIGNAL TRANSMITTING AND RECEIVING METHOD, BASE STATION, TERMINAL, AND READABLE MEDIUM

CROSS-REFERENCE

This application is a U.S. National Stage application of the PCT International Application No. PCT/CN2019/072472 filed on Jan. 21, 2019, which claims priority to Chinese patent application No. 201810153150.4 filed on Feb. 13, 2018, the contents all of which are incorporated herein by reference.

TECHNICAL FIELD

Embodiments of the present disclosure relate to communication system, in particular, to a method for transmitting a reference signal, a method for receiving the reference signal, a base station, a terminal, and a readable medium.

BACKGROUND

In a New Radio (NR) system, when a User Equipment (UE) communicates with a base station (gNB), it needs to be synchronized with the base station in time and frequency domains. Synchronization signal and tracking signal are mainly required for the UE to access a network. The synchronization signal is used for the synchronization of the UE and the network in the time and frequency domains. The tracking signal helps the UE to synchronize with the network precisely for a long period in the time and frequency domains.

In a Long Term Evolution (LTE) system, Discover Reference Signal (DRS) defined in 3GPP is used for the purposes of synchronization of UE and the base station, channel measurement, and the likes.

In an NR system, in particular for unlicensed spectrums, there is no DRS for synchronization and access at present, making it impossible for UE of an NR system to access the NR network.

SUMMARY

In the embodiments of the present disclosure, a method for transmitting the reference signal is provided; the method comprises determining locations in time and frequency domains of a Discover Reference Signal (DRS); the DRS comprises at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information. The method further comprises transmitting the DRS at the determined locations in time and frequency domains of the DRS.

In the embodiments of the present disclosure, a method for receiving the reference signal is provided; the method comprises determining locations in time and frequency domains of a DRS; the DRS comprises at least one of a PSS, an SSS, a PBCH, a DMRS for PBCH, a CSI-RS for TRS, a CSI-RS for beam management, and a CSI-RS for acquiring channel state information. The method further comprises receiving the DRS at the determined locations in time and frequency domains of the DRS.

In the embodiments of the present disclosure, a base station is provided. The base station comprises a memory and a processor; the memory stores computer instructions executable on the processor to cause the processor to perform operations comprising: determining locations in time and frequency domains of a Discover Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and transmitting the DRS at the determined locations in time and frequency domains of the DRS.

In the embodiments of the present disclosure, a terminal is provided. The terminal comprises a memory and a processor; the memory stores computer instructions executable on the processor to cause the processor to perform operations comprising: determining locations in time and frequency domains of a Discover Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and receiving the DRS at the determined locations in time and frequency domains of the DRS.

DETAILED DESCRIPTION

In an NR system, in particular for unlicensed spectrums, there is no DRS for synchronization and access at present, making it impossible for UE of an NR system to access the NR network. The Listen-Before-Talk (LBT) technology, for example, requires the UE to occupy spectrum resources when the spectrum is idle. In order to ensure a continuous transmission of the reference signal, a tracking signal needs to be transmitted to occupy the spectrum. However, currently there is no available DRS for NR system.

Embodiments of the present disclosure solve the technical problem of how to transmit the DRS to the UE so that the UE can perform synchronization and channel access based on the DRS.

The technical solutions of the embodiments according to the present disclosure have the following advantages.

In the embodiments of the present disclosure, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by transmitting the DRS at the locations in time and frequency domains of the DRS, DRS can be transmitted to UE so that the UE can perform synchronization and channel access based on the DRS.

Furthermore, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by receiving the DRS at the locations in time and frequency domains of the DRS, synchronization and channel access are made possible based on the DRS.

In addition, the SSB includes the PSS, the SSS, the PBCH and the DMRS for PBCH of adjacent symbols, and the SSB and the CSI-RS meet a relationship that, in each time slots corresponding to the SSB, there is at least one CSI-RS resource, for the channel estimation, the beam management, the acquisition of tracking reference signal and the likes by the UE, so as to keep a precise synchronization with the base station in time and frequency domains.

To make the afore-mentioned objects, features and advantages of the present disclosure apparent and easy to understand, embodiments of the present disclosure are described below in detail with reference to the drawings.

Figure 1:
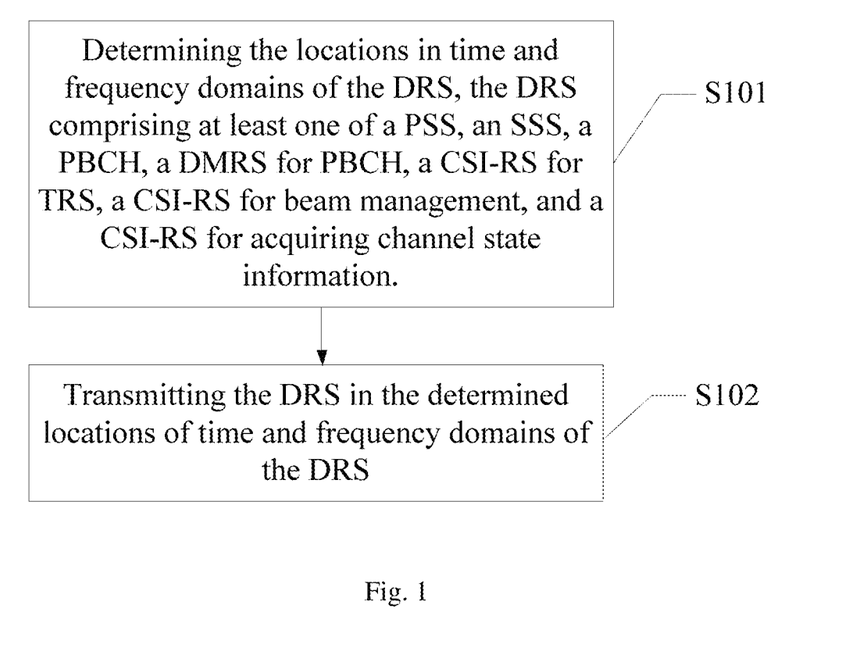
FIG. 1 is a flowchart of the method for transmitting the reference signal according to an embodiment of the present disclosure.

As shown in FIG. 1, the embodiment of the present disclosure provides a method for transmitting reference signal. The method may include the following steps.

In S101, the locations in time and frequency domains of the DRS are determined, the DRS comprising at least one of a PSS, an SSS, a PBCH, a DMRS for PBCH, a CSI-RS for TRS, a CSI-RS for beam management, and a CSI-RS for acquiring channel state information.

In some embodiments, in order to transmit the DRS to the UE, the locations in time and frequency domains of the DRS needs to be determined first, i.e. determining the locations in time domain and frequency domain occupied by the DRS; then the DRS is transmitted to the UE based on the determined locations in time and frequency domains.

In some embodiments, since the reference signal comes with a system overhead, the DRS may be existing reference signal so as to save the overhead on bytes in the wireless network.

In an embodiment of the present disclosure, the DRS includes one or more (no less than two) of: the Primary Synchronization Signal (PSS), the Secondary Synchronization Signal (SSS), the Physical Broadcast Channel (PBCH), the Demodulation Reference Signal (DMRS) for PBCH (i.e., the DMRS for receiving PBCH), the Channel State Information Reference Signal (CSI-RS) for Tracking Reference Signal (TRS), the CSI-RS for beam management, and the CSI-RS for acquiring Channel State Information (CSI) (i.e., for the channel detection).

In some embodiments, the PSS, the SSS, the PBCH, and the DMRS for PBCH of adjacent symbols may constitute a Synchronize Signal Block (SSB).

In some embodiments, each time slot may include 14 symbols, corresponding indexes thereof are respectively index 0 to index 13.

The Synchronization Signal burst (SS burst) described in the embodiment below may be a time window measured in the unit of time slots or milliseconds.

In some embodiments, the SS burst, i.e., the time window, may be a periodic signal or a non-periodic signal.

In an embodiment of the present disclosure, the time window is a periodic signal, of which the period is a preset value.

In an embodiment of the present disclosure, the time window is a periodic signal, of which the period is assigned by Radio Resource Control (RRC) signaling.

In an embodiment of the present disclosure, the time window is a non-periodic signal. The location of the time window is assigned by the RRC signaling.

In some embodiments, a PSS sequence may be generated. The PSS sequence may be located in the symbols with an index of 2 or 8 in each time slot of the SS burst.

In some embodiments, an SSS sequence may be generated. The SSS sequence may be located in the symbols with an index of 4 or 10 in each time slot of the SS burst.

In some embodiments, a PBCH sequence may be generated. The PBCH sequence may be located in the symbols with an index of 3, 5, 9, or 11 in each time slot of the SS burst.

In some embodiments, a DMRS sequence for PBCH may be generated. The DMRS sequence for PBCH may be located in symbols with an index is 3, 5, 9, or 11 in each time slot of the SS burst.

In some embodiments, the PSS, the SSS, the PBCH, and the DMRS for PBCH of adjacent symbols may constitute an SSB. The SSB and the CSI-RS may meet a relationship that, in 2 adjacent time slots corresponding to the SSB, there is at least one CSI-RS resource. In other words, in the 2 adjacent time slots corresponding to the SSB, there is at least one symbol for transmitting the CSI-RS resource.

In an embodiment of the present disclosure, the SSB is located in the symbols with an index of 2, 3, 4, 5, 8, 9, 10, or 11 in each time slot of the SS burst.

In an embodiment of the present disclosure, the CSI-RS for TRS is located in in at least one of a symbol with an index of 0 and a symbol with an index of 4 in a first time slot of the SS burst.

In an embodiment of the present disclosure, the CSI-RS for TRS is located in a symbol with an index of 0 in a third time slot of the SS burst.

In an embodiment of the present disclosure, the CSI-RS for TRS is located in a symbol with an index of 9 in a fourth time slot of the SS burst.

In some embodiments, the CSI-RS for beam management or the CSI-RS for acquiring channel state information may be located in at least one symbol in each time slot of the SS burst.

In other words, the CSI-RS for beam management or the CSI-RS for acquiring channel state information may be either located in an idle symbol of each time slot of the SS burst, or be multiplexed in a symbol with other reference signal to save transmission overhead.

It is understood that the CSI-RS may also be located in any symbol other than the locations described in the foregoing embodiments, which will not be redundantly described herein.

In some embodiments, the location of the SSB in a subframe may be jointly determined by the PSS, the SSS, the PBCH, and the DMRS for PBCH.

In an embodiment of the present disclosure, the order in time domain of the reference signals corresponding to the SSB is: the PSS is located in the starting symbol of the SSB (i.e., the first symbol corresponding to the SSB); the SSS is located in the third symbol corresponding to the SSB; and the PBCH is located in the rest symbols of the SSB.

It is understood that the first symbol corresponding to the SSB may be the symbol with an index of 0 in the time slot corresponding to the SSB, or the symbols with indexes of other values in the time slot corresponding to the SSB.

In some embodiments, the location of the SSB in the subframe may also be indicated by high-layer signaling.

In some embodiments, the method for transmitting reference signal may also include: indicating a location in time domain of the SSB by high-layer signaling; and indicating a location in frequency domain of the SSB by the high-layer signaling.

In an embodiment of the present disclosure, the location in frequency domain includes a center frequency corresponding to the SSB.

In an embodiment of the present disclosure, the center frequency is a Global Synchronization Channel Number (GSCN).

In an embodiment of the present disclosure, when indicating the location in frequency domain of the SSB by the high-layer signaling, the high-layer signaling includes: offset information of the center frequency corresponding to the SSB from a common Physical Resource Block (PRB) index 0.

In an embodiment of the present disclosure, the high-layer signaling is RRC signaling.

In an embodiment of the present disclosure, the high-layer signaling is Remaining Minimum System Information (RMSI).

In an embodiment of the present disclosure, the high-layer signaling is Other System Information (OSI).

In some embodiments, the CSI-RS may be a single-port reference signal or a multi-port reference signal, which is not limited hereto.

In an embodiment of the present disclosure, the CSI-RS has a frequency domain density of 3 and a location in frequency domain starting from a subcarrier 0 (i.e. a subcarrier with an index of 0) or a subcarrier N (i.e. a subcarrier with an index of N), wherein N is a natural number, and $0 \leq N \leq 11$.

In an embodiment of the present disclosure, the CSI-RS has a frequency domain density of 1 and a location in frequency domain starting from a subcarrier 0 or a subcarrier N, wherein N is a natural number, and $0 \leq N \leq 11$.

In an embodiment of the present disclosure, the CSI-RS has a frequency domain density of ½ and a location in frequency domain starting from a subcarrier 0 or a subcarrier N, wherein N is a natural number, and $0 \leq N \leq 23$.

In some embodiments, the value of N may be indicated by the high-layer signaling.

In an embodiment of the present disclosure, the high-layer signaling is RRC.

In an embodiment of the present disclosure, the high-layer signaling is RMSI.

In an embodiment of the present disclosure, the high-layer signaling is OSI.

In S102, the DRS is transmitted in the locations of time and frequency domains of the DRS.

In some embodiments, when the locations in time and frequency domains of the DRS are determined, the DRS may be transmitted at the locations in time and frequency domains location of the DRS.

It is understood that the method for transmitting reference signal is applicable in licensed spectrum of NR system as well as unlicensed spectrum of NR system.

In the afore-described technical solution, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by transmitting the DRS at the locations in time and frequency domains of the DRS, the DRS can be transmitted to the UE so that the UE can perform synchronization and channel access based on the DRS.

Figure 2:
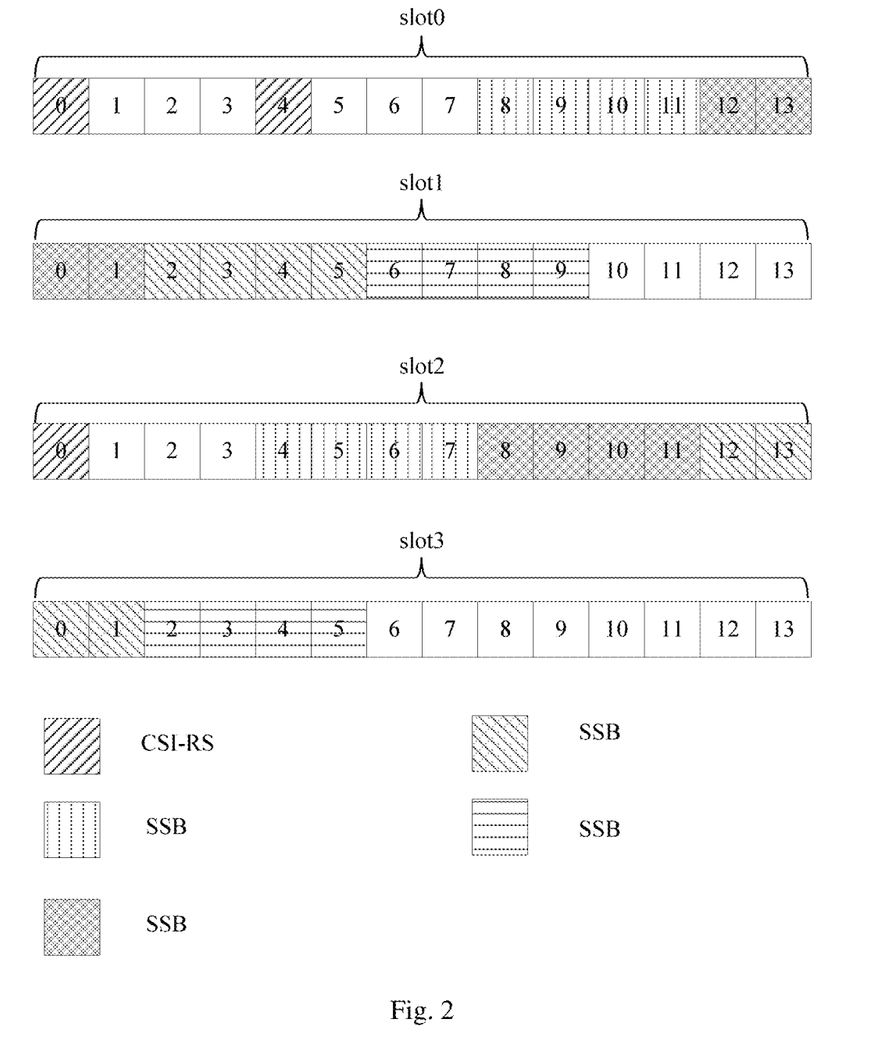
FIG. 2 is a schematic diagram of formats of time slots occupied by the SSB and the CSI-RS according to an embodiment of the present disclosure.

For a better understanding and implementation by the skilled in the art on the present disclosure, a schematic diagram of formats of time slot occupied by the SSB and the CSI-RS according to an embodiment of the present disclosure is shown in FIG. 2.

Referring to FIG. 2, each time slot includes 14 symbols, corresponding indexes thereof are respectively index 0 to index 13. With a subcarrier spacing of 240 kHz, the SSB is comprised by adjacent PSS, SSS, PBCH, and DMRS for PBCH. The time slots occupied by the SSB includes symbols with index 8 to index 13 and of time slot format 0, symbols with index 0 to index 9 and of time slot format 1, symbols with index 4 to index 13 and of time slot format 2, and symbols with index 0 to index 5 and of time slot format 3.

The time slot occupied by the CSI-RS includes symbols with index 0 and index 4 and of time slot format 0, and the symbol with index 0 and of time slot format 2.

As shown in FIG. 2, in the zero and the first time slots corresponding to the SSB, there are two symbols of CSI-RS resource; and in the first and second time slots corresponding to the SSB, there is one symbol of CSI-RS resource. Thus, the restricting condition that in 2 adjacent time slots corresponding to the SSB there is at least one CSI-RS resource is satisfied.

Figure 3:
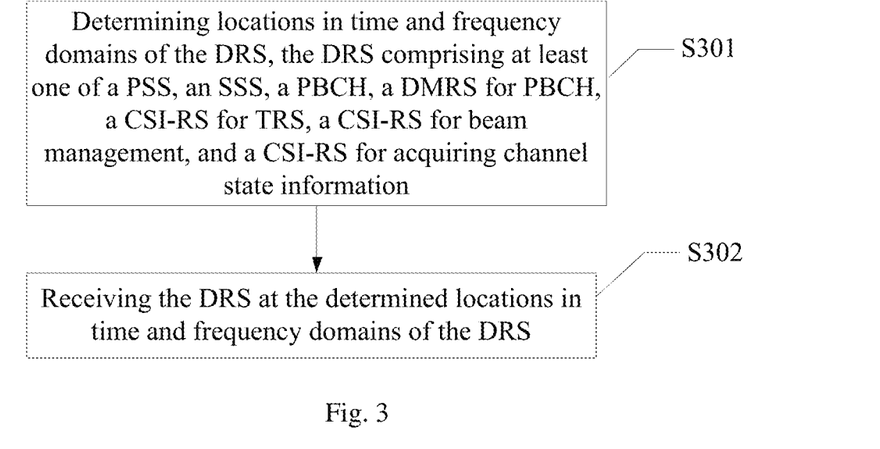
FIG. 3 is a flowchart of the method for receiving the reference signal according to an embodiment of the present disclosure.

For a better understanding and implementation by the skilled in the art on the present disclosure, the method for receiving reference signal according to an embodiment of the present disclosure is shown in FIG. 3.

As shown in FIG. 3, the method for receiving the reference signal may include the following steps.

In S301, locations in time and frequency domains of the DRS are determined, the DRS comprising at least one of a PSS, an SSS, a PBCH, a DMRS for PBCH, a CSI-RS for TRS, a CSI-RS for beam management, and a CSI-RS for acquiring channel state information.

In S302, the DRS is received at the determined locations in time and frequency domains of the DRS.

In some embodiments, the SSB includes the PSS, the SSS, the PBCH and the DMRS for PBCH of adjacent symbols, and the SSB and the CSI-RS meet a relationship that, in two adjacent time slots corresponding to the SSB, there is at least one CSI-RS resource.

In an embodiment of the present disclosure, the CSI-RS for TRS is located in at least one of a symbol with an index of 0 and a symbol with an index of 4 in a first time slot of an SS burst.

In an embodiment of the present disclosure, the CSI-RS for TRS is located in a symbol with an index of 0 in a third time slot of the SS burst.

In an embodiment of the present disclosure, the CSI-RS for TRS is located in a symbol with an index of 9 in a fourth time slot of the SS burst.

In an embodiment of the present disclosure, the CSI-RS for beam management or the CSI-RS for acquiring channel state information is located in at least one symbol in each time slot of the SS burst.

In some embodiments, the CSI-RS has a frequency domain density of 3 and a location in frequency domain starting from a subcarrier 0 or a subcarrier N, wherein N is a natural number, and $0 \leq N \leq 11$.

In some embodiments, the CSI-RS has a frequency domain density of 1 and a location in frequency domain starting from a subcarrier 0 or a subcarrier N, wherein N is a natural number, and $0 \leq N \leq 11$.

In some embodiments, the CSI-RS has a frequency domain density of ½ and a location in frequency domain starting from a subcarrier 0 or a subcarrier N, wherein N is a natural number, and $0 \leq N \leq 23$.

In some embodiments, the method for receiving reference signal further comprises acquiring a value of N from indication information of high-layer signaling. In some embodiments, the method for receiving reference signal further comprises: acquiring a location in time domain of the SSB from indication information of high-layer signaling; and acquiring a location in frequency domain of the SSB from indication information of the high-layer signaling.

In an embodiment of the present disclosure, the high-layer signaling is RRC signaling.

In an embodiment of the present disclosure, the high-layer signaling is RMSI.

In an embodiment of the present disclosure, the high-layer signaling is OSI.

In an embodiment of the present disclosure, the location in frequency domain includes a center frequency corresponding to the SSB.

In an embodiment of the present disclosure, the center frequency is a Global Synchronization Channel Number (GSCN).

In an embodiment of the present disclosure, the high-layer signaling includes offset information of the center frequency corresponding to the SSB from a common PRB index 0.

It is understood that the method for receiving reference signal is applicable to the receiving in the licensed spectrum of NR system as well as the unlicensed spectrum of NR system.

According to the above-described technical solution, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by receiving the DRS at the locations in time and frequency domains of the DRS, synchronization and channel access are made possible based on the DRS.

Figure 4:
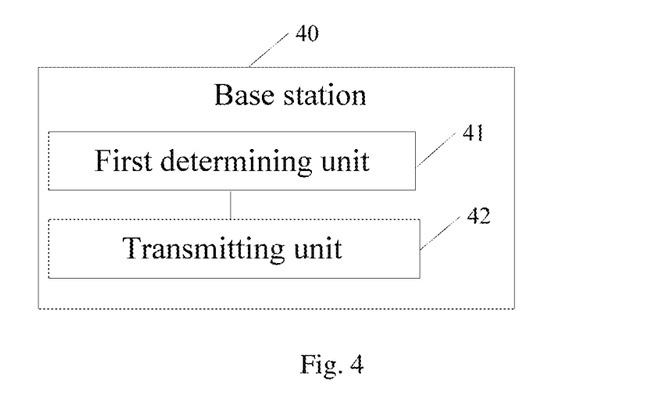
FIG. 4 is a structural diagram of a base station according to an embodiment of the present disclosure.

For a better understanding and implementation by the skilled in the art on the present disclosure, the base station achieving the method for transmitting reference signal according to an embodiment of the present disclosure is shown in FIG. 4.

Referring to FIG. 4, the base station 40 may comprise a first determining unit 41 and a transmitting unit 42, wherein, the first determining unit 41 is adapted to determine locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information;

the transmitting unit 42 is adapted to transmit the DRS at the determined locations in time and frequency domains of the DRS.

In some embodiments, the SSB includes the PSS, the SSS, the PBCH and the DMRS for PBCH of adjacent symbols, and the SSB and the CSI-RS meet a relationship that, in two adjacent time slots corresponding to the SSB, there is at least one CSI-RS resource.

In an embodiment of the present disclosure, the CSI-RS for TRS is located in in at least one of a symbol with an index of 0 and a symbol with an index of 4 in a first time slot of an SS burst.

In an embodiment of the present disclosure, the CSI-RS for TRS is located in a symbol with an index of 0 in a third time slot of the SS burst.

In an embodiment of the present disclosure, the CSI-RS for TRS is located in a symbol with an index of 9 in a fourth time slot of the SS burst.

In an embodiment of the present disclosure, the CSI-RS for beam management or the CSI-RS for acquiring channel state information is located in at least one symbol in each time slot of the SS burst.

In some embodiments, the CSI-RS has a frequency domain density of 3 and a location in frequency domain starting from a subcarrier 0 or a subcarrier N, wherein N is a natural number, and $0 \leq N \leq 11$.

In some embodiments, the CSI-RS has a frequency domain density of 1 and a location in frequency domain starting from a subcarrier 0 or a subcarrier N, wherein N is a natural number, and $0 \leq N \leq 11$.

In some embodiments, the CSI-RS has a frequency domain density of ½ and a location in frequency domain starting from a subcarrier 0 or a subcarrier N, wherein N is a natural number, and $0 \leq N \leq 23$.

In some embodiments, the base station 40 may also include a first indicating unit (not shown) adapted to indicate a value of N by the high-layer signaling.

In some embodiments, the base station 40 may also include a second indicating unit (not shown) and a third indicating unit (not shown), wherein, the second indicating unit is adapted to indicate the location in time domain of the SSB by the high-layer signaling, the third indicating unit is adapted to indicate the location in frequency domain of the SSB by the high-layer signaling.

In an embodiment of the present disclosure, the location in frequency domain includes a center frequency corresponding to the SSB.

In an embodiment of the present disclosure, the center frequency is a Global Synchronization Channel Number (GSCN).

In an embodiment of the present disclosure, the high-layer signaling includes offset information of the center frequency corresponding to the SSB from a common PRB index 0.

In some embodiments, the methods according to the afore-described embodiments can be referred to for the workflow and working principles of the base station 40, which will not be repeated herein.

Figure 5:
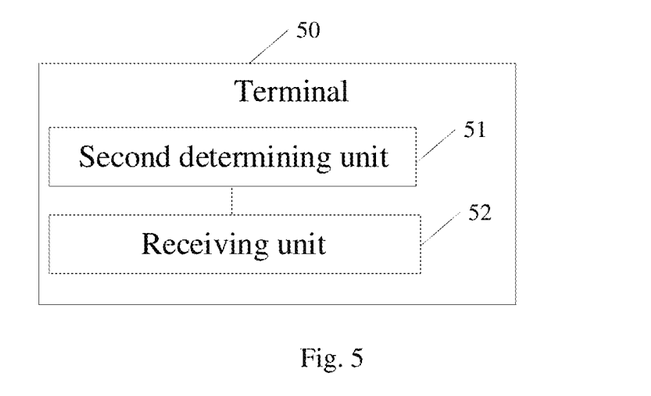
FIG. 5 is a structural diagram of a terminal according to an embodiment of the present disclosure.

For a better understanding and implementation by the skilled in the art on the present disclosure, the terminal achieving the method for receiving reference signal according to an embodiment of the present disclosure is shown in FIG. 4.

Referring to FIG. 5, the terminal 50 may comprise a second determining unit 51 and a receiving unit 52, wherein the second determining unit 51 is adapted to determine locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information;

the receiving unit 52 is adapted to receive the DRS at the determined locations in time and frequency domains of the DRS.

In some embodiments, SSB includes the PSS, the SSS, the PBCH and the DMRS for PBCH of adjacent symbols, and the SSB and the CSI-RS satisfy a relationship that, in two adjacent time slots corresponding to the SSB, there is at least one CSI-RS resource.

In an embodiment of the present disclosure, the CSI-RS for TRS is located in at least one of a symbol with an index of 0 and a symbol with an index of 4 in a first time slot of an SS burst.

In an embodiment of the present disclosure, the CSI-RS for TRS is located in a symbol with an index of 0 in a third time slot of the SS burst.

In an embodiment of the present disclosure, the CSI-RS for TRS is located in a symbol with an index of 9 in a fourth time slot of the SS burst.

In an embodiment of the present disclosure, the CSI-RS for beam management or the CSI-RS for acquiring channel state information is located in at least one symbol in each time slot of the SS burst.

In some embodiments, the CSI-RS has a frequency domain density of 3 and a location in frequency domain starting from a subcarrier 0 or a subcarrier N, wherein N is a natural number, and $0 \leq N \leq 11$.

In some embodiments, the CSI-RS has a frequency domain density of 1 and a location in frequency domain starting from a subcarrier 0 or a subcarrier N, wherein N is a natural number, and $0 \leq N \leq 11$.

In some embodiments, the CSI-RS has a frequency domain density of ½ and a location in frequency domain starting from a subcarrier 0 or a subcarrier N, wherein N is a natural number, and $0 \leq N \leq 23$.

In some embodiments, the terminal 50 may also include a first acquiring unit (not shown) adapted to acquire a value of N from indicating information of high-layer signaling.

In some embodiments, the terminal 50 may also include a second acquiring unit (not shown) and a third acquiring unit (not shown), wherein, the second acquiring unit is adapted to acquire a location in time domain of the SSB from indicating information of the high-layer signaling;

the third acquiring unit is adapted to acquire a location in frequency domain of the SSB from indicating information of the high-layer signaling.

In an embodiment of the present disclosure, the location in frequency domain includes a center frequency corresponding to the SSB.

In an embodiment of the present disclosure, the center frequency is a Global Synchronization Channel Number (GSCN).

In an embodiment of the present disclosure, the indicating information of the high-layer signaling includes: offset information of the center frequency corresponding to the SSB from a common PRB index 0.

In some embodiments, the methods according to the afore-described embodiments can be referred to for the workflow and working principles of the terminal 50, which will not be repeated herein.

In the embodiments of the present disclosure there is provided a computer readable storage medium. The computer readable storage medium may be a non-volatile memory or a non-transitory memory. The computer readable storage medium stores computer instructions, which performs the steps of any one of the afore-described method for transmitting reference signal and the method for receiving reference signal when being executed.

In the embodiments of the present disclosure there is provided a base station, comprising a memory and a processor, wherein the memory stores computer instructions executable on the processor to cause the processor to perform the steps of any one of the afore-described method for transmitting reference signal, which is not repeated herein.

In the embodiments of the present disclosure there is provided a terminal, comprising a memory and a processor, wherein the memory stores computer instructions executable on the processor to cause the processor to perform the steps of any one of the afore-described method for receiving reference signal, which is not repeated herein.

Embodiments of the present disclosure solve the technical problem of how to transmit the DRS to the UE so that the UE can perform synchronization and channel access based on the DRS.

To solve this technical problem, in the embodiments of the present disclosure, a method for transmitting the reference signal is provided; the method comprises determining locations in time and frequency domains of a Discover Reference Signal (DRS); the DRS comprises at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information. The method further comprises transmitting the DRS at the determined locations in time and frequency domains of the DRS.

Optionally, a Synchronization Signal Block (SSB) includes the PSS, the SSS, the PBCH and the DMRS for PBCH of adjacent symbols; the SSB and the CSI-RS meet a relationship that, in two adjacent time slots corresponding to the SSB, there is at least one CSI-RS resource.

Optionally, the CSI-RS for TRS is located in at least one of the following symbols in a first time slot of a Synchronization Signal burst (SS burst): a symbol with an index of 0 and a symbol with an index of 4.

Optionally, the CSI-RS for TRS is located in a symbol with an index of 0 in a third time slot of the SS burst.

Optionally, the CSI-RS for TRS is located in a symbol with an index of 9 in a fourth time slot of the SS burst.

Optionally, the CSI-RS for beam management or the CSI-RS for acquiring channel state information is located in at least one symbol in each time slot of the SS burst.

Optionally, the CSI-RS has a frequency domain density of 3. The location of the CSI-RS in frequency domain starts from a subcarrier 0 or a subcarrier N, with N being a natural number, and $0 \leq N \leq 11$.

Optionally, the CSI-RS has a frequency domain density of 1. The location of the CSI-RS in frequency domain starts from a subcarrier 0 or a subcarrier N, with N being a natural number, and $0 \leq N \leq 11$.

Optionally, the CSI-RS has a frequency domain density of ½. The location of the CSI-RS in frequency domain starts from a subcarrier 0 or a subcarrier N, with N being a natural number, and $0 \leq N \leq 23$.

Optionally, the method for transmitting reference signal further comprises indicating a value of N by high-layer signaling.

Optionally, the method for transmitting reference signal further comprises indicating a location in time domain of the SSB by high-layer signaling as well as indicating a location in frequency domain of the SSB by the high-layer signaling.

Optionally, the location in frequency domain includes a center frequency corresponding to the SSB.

Optionally, the high-layer signaling includes: offset information of the center frequency corresponding to the SSB from a common Physical Resource Block (PRB) index 0.

In the embodiments of the present disclosure, a method for receiving the reference signal is provided; the method comprises determining locations in time and frequency domains of a DRS; the DRS comprises at least one of a PSS, an SSS, a PBCH, a DMRS for PBCH, a CSI-RS for TRS, a CSI-RS for beam management, and a CSI-RS for acquiring channel state information. The method further comprises receiving the DRS at the determined locations in time and frequency domains of the DRS.

Optionally, an SSB includes the PSS, the SSS, the PBCH and the DMRS for PBCH of adjacent symbols; the SSB and the CSI-RS meet a relationship that, in two adjacent time slots corresponding to the SSB, there is at least one CSI-RS resource.

Optionally, the CSI-RS for TRS is located in at least one of the following symbols in a first time slot of an SS burst: a symbol with an index of 0 and a symbol with an index of 4.

Optionally, the CSI-RS for TRS is located in a symbol with an index of 0 in a third time slot of the SS burst.

Optionally, the CSI-RS for TRS is located in a symbol with an index of 9 in a fourth time slot of the SS burst.

Optionally, the CSI-RS for beam management or the CSI-RS for acquiring channel state information is located in at least one symbol in each time slot of the SS burst.

Optionally, the CSI-RS has a frequency domain density of 3. The location of the CSI-RS in frequency domain starts from a subcarrier 0 or a subcarrier N, with N being a natural number, and $0 \leq N \leq 11$.

Optionally, the CSI-RS has a frequency domain density of 1. The location of the CSI-RS in frequency domain starts from a subcarrier 0 or a subcarrier N, with N being a natural number, and $0 \leq N \leq 11$.

Optionally, the CSI-RS has a frequency domain density of ½. The location of the CSI-RS in frequency domain starts from a subcarrier 0 or a subcarrier N, with N being a natural number, and $0 \leq N \leq 23$.

Optionally, the method for receiving the reference signal further comprises acquiring a value of N from indication information of high-layer signaling.

Optionally, the method for receiving the reference signal further comprises acquiring a location in time domain of the SSB from indication information of high-layer signaling; and acquiring a location in frequency domain of the SSB from indication information of the high-layer signaling.

Optionally, the location in frequency domain includes a center frequency corresponding to the SSB.

Optionally, the high-layer signaling includes: offset information of the center frequency corresponding to the SSB from a common PRB index 0.

In the embodiments of the present disclosure, a base station is provided. The base station comprises a first determining unit that is adapted to determine locations in time and frequency domains of a DRS; the DRS comprises at least one of a PSS, an SSS, a PBCH, a DMRS for PBCH, a CSI-RS for TRS, a CSI-RS for beam management, and a CSI-RS for acquiring channel state information. The base station further comprises a transmitting unit that is adapted to transmit the DRS at the determined locations in time and frequency domains of the DRS.

Optionally, an SSB includes the PSS, the SSS, the PBCH and the DMRS for PBCH of adjacent symbols; the SSB and the CSI-RS meet a relationship that, in two adjacent time slots corresponding to the SSB, there is at least one CSI-RS resource.

Optionally, the CSI-RS for TRS is located in at least one of the following symbols in a first time slot of an SS burst: a symbol with an index of 0 and a symbol with an index of 4.

Optionally, the CSI-RS for TRS is located in a symbol with an index of 0 in a third time slot of the SS burst.

Optionally, the CSI-RS for TRS is located in a symbol with an index of 9 in a fourth time slot of the SS burst.

Optionally, the CSI-RS for beam management or the CSI-RS for acquiring channel state information is located in at least one symbol in each time slot of the SS-burst.

Optionally, the CSI-RS has a frequency domain density of 3. The location of the CSI_RS in frequency domain starts from a subcarrier 0 or a subcarrier N, with N being a natural number, and $0 \leq N \leq 11$.

Optionally, the CSI-RS has a frequency domain density of 1. The location of the CSI_RS in frequency domain starts from a subcarrier 0 or a subcarrier N, with N being a natural number, and $0 \leq N \leq 11$.

Optionally, the CSI-RS has a frequency domain density of ½. The location of the CSI_RS in frequency domain starts from a subcarrier 0 or a subcarrier N, with N being a natural number, and $0 \leq N \leq 23$.

Optionally, the base station further comprises a first indicating unit that is adapted to indicate a value of N by high-layer signaling.

Optionally, the base station further comprises a second indicating unit that is adapted to indicate a location in time domain of the SSB by high-layer signaling; and a third indicating unit that is adapted to indicate a location in frequency domain of the SSB by the high-layer signaling.

Optionally, the location in frequency domain includes a center frequency corresponding to the SSB.

Optionally, the high-layer signaling includes: offset information of the center frequency corresponding to the SSB from a common PRB index 0.

In the embodiments of the present disclosure, a terminal is provided; the terminal comprises a second determining unit that is adapted to determine locations in time and frequency domains of a DRS; the DRS comprises at least one of a PSS, an SSS, a PBCH, a DMRS for PBCH, a CSI-RS for TRS, a CSI-RS for beam management, and a CSI-RS for acquiring channel state information. The terminal further comprises a receiving unit that is adapted to receive the DRS at the determined locations in time and frequency domains of the DRS.

Optionally, an SSB includes the PSS, the SSS, the PBCH and the DMRS for PBCH of adjacent symbols; the SSB and the CSI-RS meet a relationship that, in two adjacent time slots corresponding to the SSB, there is at least one CSI-RS resource.

Optionally, the CSI-RS for TRS is located in at least one of the following symbols in a first time slot of an SS burst: a symbol with an index of 0 and a symbol with an index of 4.

Optionally, the CSI-RS for TRS is located in a symbol with an index of 0 in a third time slot of the SS burst.

Optionally, the CSI-RS for TRS is located in a symbol with an index of 9 in a fourth time slot of the SS burst.

Optionally, the CSI-RS for beam management or the CSI-RS for acquiring channel state information is located in at least one symbol in each time slot of SS burst.

Optionally, the CSI-RS has a frequency domain density of 3. The location of the CSI-RS in frequency domain starts from a subcarrier 0 or a subcarrier N, with N being a natural number, and $0 \leq N \leq 11$.

Optionally, the CSI-RS has a frequency domain density of 1. The location of the CSI-RS in frequency domain starts from a subcarrier 0 or a subcarrier N, with N being a natural number, and $0 \leq N \leq 11$.

Optionally, the CSI-RS has a frequency domain density of ½. The location of the CSI-RS in frequency domain starts from a subcarrier 0 or a subcarrier N, with N being a natural number, and 0≤N≤23.

Optionally, the terminal further comprises: a first acquiring unit that is adapted to acquire a value of N from indication information of high-layer signaling.

Optionally, the terminal further comprises: a second acquiring unit that is adapted to acquire a location in time domain of the SSB from indicating information of high-layer signaling; and a third acquiring unit that is adapted to acquire a location in frequency domain of the SSB from indicating information of high-layer signaling.

Optionally, the location in frequency domain location includes a center frequency corresponding to the SSB.

Optionally, the indicating information of the high-layer signaling includes: offset information of the center frequency corresponding to the SSB from a common PRB index 0.

In the embodiments of the present disclosure, a computer readable storage medium is provided. The computer readable storage medium stores computer instructions; when being executed, the computer instructions perform steps of any one of the afore-described method for transmitting the reference signal and the method for receiving the reference signal.

In the embodiments of the present disclosure, a base station is provided. The base station comprises a memory and a processor; the memory stores computer instructions executable on the processor to cause the processor to perform the steps of the afore-described method for transmitting the reference signal.

In the embodiments of the present disclosure, a terminal is provided. The terminal comprises a memory and a processor; the memory stores computer instructions executable on the processor to cause the processor to perform the steps of the afore-described method for receiving reference signal.

Compared to the prior art, the technical solutions of the embodiments according to the present disclosure have the following advantages.

In the embodiments of the present disclosure, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by transmitting the DRS at the locations in time and frequency domains of the DRS, the DRS can be transmitted to the UE so that the UE can perform synchronization and channel access based on the DRS.

Furthermore, by determining the locations in time and frequency domains of the DRS, where the DRS comprising at least one of a PSS, an SSS, a PBCH, a DMRS for PBCH, a CSI-RS for TRS, a CSI-RS for beam management, and a CSI-RS for acquiring channel state information, and then by receiving the DRS at the locations in time and frequency domains of the DRS, synchronization and channel access are made possible based on the DRS.

In addition, the SSB includes the PSS, the SSS, the PBCH and the DMRS for PBCH of adjacent symbols, and the SSB and the CSI-RS meet a relationship that, in each time slots corresponding to the SSB, there is at least one CSI-RS resource, for the channel estimation, the beam management, the acquisition of tracking reference signal and the likes by the UE, so as to keep a precise synchronization with the base station in time and frequency domains.

One skilled in the art may understand that all or a part of the steps of various methods according to the afore-described embodiments may be implemented by relative hardware under instructions from a program. The program may be stored in a computer readable storage medium, which may include: a ROM, a RAM, a magnetic disk, an optical disk, etc.

Although the present disclosure is described in the foregoing, it is not limited thereto. Without departing the spirits and the scope of the present disclosure, a number of variations and modifications may occur to one skilled in the art. Therefore, the protection scope of the present disclosure should be defined by the claims.

What is claimed is:

1. A method for transmitting a reference signal, comprising:
   determining locations in time domain and frequency domain of a Discover Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and
   transmitting the DRS at the determined locations in time domain and frequency domain of the DRS,
   wherein the CSI-RS for TRS is located in at least one of a symbol with an index of 0 and a symbol with an index of 4 in a first time slot of a Synchronization Signal burst (SS burst); or
   the CSI-RS for TRS is located in a symbol with an index of 0 in a third time slot of a Synchronization Signal burst (SS burst); or
   the CSI-RS for TRS is located in a symbol with an index of 9 in a fourth time slot of a Synchronization Signal burst (SS burst).

2. The method according to claim 1, wherein, in two time slots adjacent to a Synchronization Signal Block (SSB), there is at least one CSI-RS,
   wherein the CSI-RS includes one of CSI-RS for TRS, the CSI-RS for beam management, and the CSI-RS for acquiring channel state information,
   wherein the SSB includes the PSS, the SSS, the PBCH and the DMRS for PBCH of adjacent symbols.

3. The method according to claim 2, wherein the CSI-RS for beam management or the CSI-RS for acquiring channel state information is located in at least one symbol in each time slot of a Synchronization Signal burst (SS burst).

4. The method according to claim 2, wherein the CSI-RS has a frequency domain density of 3 and a location in frequency domain starting from a subcarrier 0 or a subcarrier N, wherein N is a natural number, and 0≤N≤11; or
   the CSI-RS has a frequency domain density of 1 and a location in frequency domain starting from a subcarrier 0 or a subcarrier N, wherein N is a natural number, and 0≤N≤11; or
   the CSI-RS has a frequency domain density of ½ and a location in frequency domain starting from a subcarrier 0 or a subcarrier N, wherein N is a natural number, and 0≤N≤23.

5. The method according to claim 4, further comprising: indicating a value of N by high-layer signaling.

6. The method according to claim 2, further comprising: indicating a location in time domain of the SSB by high-layer signaling; and indicating a location in frequency domain of the SSB by the high-layer signaling.

7. The method according to claim 6, wherein the location in frequency domain includes a center frequency corresponding to the SSB.

8. The method according to claim 7, wherein the high-layer signaling includes offset information of the center frequency corresponding to the SSB from a common Physical Resource Block (PRB) index 0.

9. A base station comprising a memory and a processor, the memory storing computer instructions, wherein the computer instructions cause the processor to:
  determine locations in time domain and frequency domain of a Discover Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and
  transmit the DRS at the determined locations in time domain and frequency domain of the DRS,
  wherein the CSI-RS for TRS is located in at least one of a symbol with an index of 0 and a symbol with an index of 4 in a first time slot of a Synchronization Signal burst (SS burst); or
  the CSI-RS for TRS is located in a symbol with an index of 0 in a third time slot of a Synchronization Signal burst (SS burst); or
  the CSI-RS for TRS is located in a symbol with an index of 9 in a fourth time slot of a Synchronization Signal burst (SS burst).

10. The base station according to claim 9, wherein, in two time slots adjacent to a Synchronization Signal Block (SSB), there is at least one CSI-RS,
  wherein the CSI-RS includes one of CSI-RS for TRS, the CSI-RS for beam management, and the CSI-RS for acquiring channel state information,
  wherein the SSB includes the PSS, the SSS, the PBCH and the DMRS for PBCH of adjacent symbols.

11. The base station according to claim 10, wherein the CSI-RS for beam management or the CSI-RS for acquiring channel state information is located in at least one symbol in each time slot of a Synchronization Signal burst (SS burst).

12. The base station according to claim 10, wherein the CSI-RS has a frequency domain density of 3 and a location in frequency domain starting from a subcarrier 0 or a subcarrier N, wherein N is a natural number, and $0 \leq N \leq 11$; or
  the CSI-RS has a frequency domain density of 1 and a location in frequency domain starting from a subcarrier 0 or a subcarrier N, wherein N is a natural number, and $0 \leq N \leq 11$; or
  the CSI-RS has a frequency domain density of ½ and a location in frequency domain starting from a subcarrier 0 or a subcarrier N, wherein N is a natural number, and $0 \leq N \leq 23$.

13. The base station according to claim 12, wherein the computer instructions further cause the processor to indicate a value of N by high-layer signaling.

14. The base station according to claim 10, wherein the computer instructions further cause the processor to:
  indicate a location in time domain of the SSB by high-layer signaling; and
  indicate a location in frequency domain of the SSB by the high-layer signaling.

15. The base station according to claim 14, wherein the location in frequency domain includes a center frequency corresponding to the SSB.

16. The base station according to claim 15, wherein the high-layer signaling includes offset information of the center frequency corresponding to the SSB from a common Physical Resource Block (PRB) index 0.

17. A non-transitory computer readable storage medium storing computer instructions, wherein the computer instructions cause a processor to:
  determine locations in time domain and frequency domain of a Discover Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and
  transmit the DRS at the determined locations in time domain and frequency domain of the DRS,
  wherein the CSI-RS for TRS is located in at least one of a symbol with an index of 0 and a symbol with an index of 4 in a first time slot of a Synchronization Signal burst (SS burst); or
  the CSI-RS for TRS is located in a symbol with an index of 0 in a third time slot of a Synchronization Signal burst (SS burst); or
  the CSI-RS for TRS is located in a symbol with an index of 9 in a fourth time slot of a Synchronization Signal burst (SS burst).

18. The non-transitory computer readable storage medium according to claim 17, wherein, in two time slots adjacent to a Synchronization Signal Block (SSB), there is at least one CSI-RS,
  wherein the CSI-RS includes one of CSI-RS for TRS, the CSI-RS for beam management, and the CSI-RS for acquiring channel state information,
  wherein the SSB includes the PSS, the SSS, the PBCH and the DMRS for PBCH of adjacent symbols.

* * * * *